United States Patent [19]
Bodner

[11] 3,862,809
[45] Jan. 28, 1975

[54] FASTENER ASSEMBLY
[76] Inventor: Norbert Bodner, 7102 River Road, Richmond, Va. 23229
[22] Filed: May 31, 1973
[21] Appl. No.: 365,701

[52] U.S. Cl. ................. 403/407, 403/403, 403/382, 52/754
[51] Int. Cl. ........................................... F16b 12/50
[58] Field of Search ................. 52/753 D, 754, 760; 403/403, 407, 382

[56] References Cited
UNITED STATES PATENTS
1,182,610  5/1916  Wiesman ............................ 403/407
2,340,545  2/1944  Marsh ................................. 403/407
3,102,308  9/1963  Parkin ................................. 52/753

FOREIGN PATENTS OR APPLICATIONS
1,258,486  3/1961  France ............................ 52/753 D Primary Examiner—Richard J. Scanlan, Jr.

[57] ABSTRACT

Fastener assembly structure for joining separate members rigidly by means of two block elements affixed at the joint of the members and locked rigidly in place by means of a locking element operating in a wedging action when slid into place along tapered slots in the block elements which are held in place by tongue in groove elements, providing reinforcement of the joint, and capable of being attached and disattached easily without injury to the members or attaching parts.

9 Claims, 17 Drawing Figures

PATENTED JAN 28 1975 3,862,809

3,862,809

FASTENER ASSEMBLY

BRIEF SUMMARY OF THE INVENTION

This invention relates to a structure for joining separate members rigidly at right angles, or as modified, at a 180 degree angle, or at any angle desired, by attaching two block elements, one on each member to be joined, in such fashion as to fit into one another firmly through the fitting of the tongue constituting a part of one block element into the groove constituting a part of the other block element, thus positioning the members to be joined. A locking element is then slid into tapered slots, one of which is made part of each block member, in such manner as to tighten and lock the block elements together in a wedging action. In a modification, a flange in the locking member fits into a slot along the top of both the block members in such manner as to reinforce and position the block members further. The block elements so fixed also add strength at the intersection of the members to be joined, which can be disattached by the withdrawal of the locking element along the slots, without damage to the elements of the members to be joined, and capable of repeated attachment and disattachment without impairment of efficiency.

BRIEF DESCRIPTION OF THE SEVERAL VIEWS OF DRAWING

FIG. 1 is an isometric view of the invention.
FIG. 2 is a sectional view on line 2—2 of FIG. 1.
FIG. 3 is a sectional view on line 3—3 of FIG. 1.
FIG. 4 is a sectional view on line 4—4 of FIG. 1.
FIG. 5 is a sectional view on line 5—5 of FIG. 1.
FIG. 6 is a sectional view on line 6—6 of FIG. 1.
FIG. 7 is a plan view of a use of the invention.
FIG. 8 is an elevational view of a modification of the invention.
FIG. 9 is a sectional view on line 9—9 of FIG. 8.
FIG. 10 is an elevational view of another modification of the invention.
FIG. 11 is a sectional view on line 11 of FIG. 10.
FIG. 12 is a sectional view on line 12—12 of FIG. 10.
FIG. 13 is an elevational view of another modification of the invention.
FIG. 14 is a plan view on line 14—14 of FIG. 13.
FIG. 15 is a side view on line 15—15 of FIG. 13.
FIG. 16 is a sectional view on line 16—16 of FIG. 13.
FIG. 17 is an operational diagram (part in section) of the invention.

DETAILED DESCRIPTION

Figure 2:
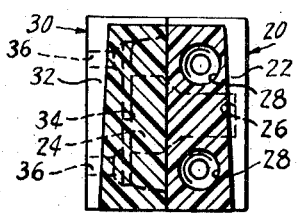
Figure 1:
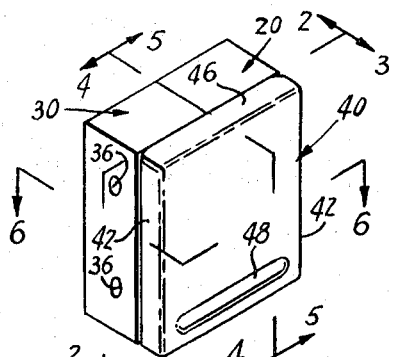
Figure 3:
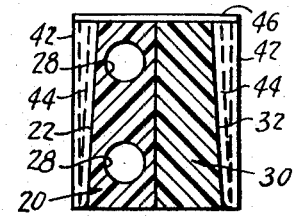
Figure 4:
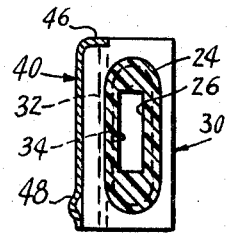
Figure 6:
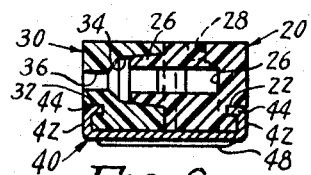
Figure 5:
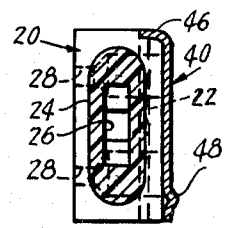
Figure 7:
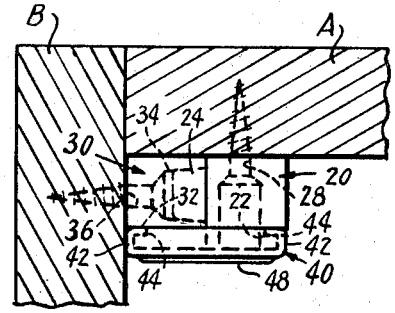
Figure 17:
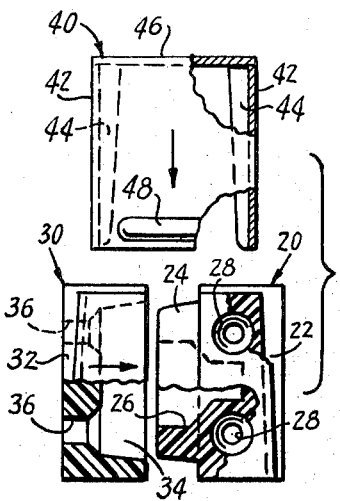

Referring to the drawings, and particularly to FIG. 1, male block member 20, which may be made of plastic or other suitable material, is locked to female block member 30, also made of plastic or other suitable material, by means of a locking cover 40 made of metal or other suitable material having a side element 42, a top 46, and a raised finger grip 48, which locking cover is slid onto the block members as shown more particularly by FIG. 17. The locking structure is more particularly shown by FIGS. 2 and 3, which show the tapered slot edges 22 and 32 along which the tapered locking element's sides 44 slides, thus locking the block members into place. The male tongue element 24 fits into the female or groove element 34 to position the block members in place. A mold press finger 26 in the male member forces the molding material into position to assure a tight fit between the male and female members. The block members are attached to the separate members to be joined through countersunk screw holes in the male member 28 and in the female member 36 so that the separate members A and B are attached at a 90° angle, as shown more particularly in FIG. 7. Side views of the invention showing sections are shown in FIGS. 4 and 5, and FIG. 6 shows a sectional view from the top.

Figure 8:
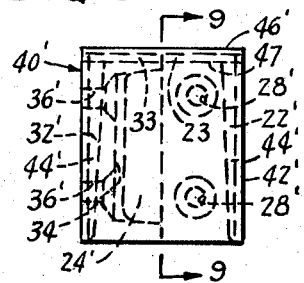
Figure 9:
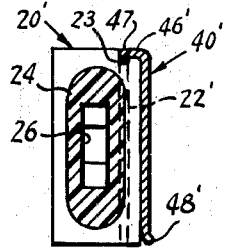

A modification of the invention is illustrated in FIG. 8, wherein male block element 20' and female block element 30' are joined by tapered slot elements 22' and 32' into which fit locking male and female locking elements 24' and 34'. Countersunk screw holes are shown as 28' and 36', and a mold finger press by 26'. A top locking slot in this modification, in the male and female members 33, is provided, into which fits a top locking flange 47, as more particularly shown in FIG. 9, which flange is an extension of locking cover 40'. The sides of the locking element 44' are tapered, and the side element is shown as 42' and the top as 46'. The extension of the flange, which fits into the slots in the block members, provides strength and positioning, and constitutes the difference in this modification.

Figure 11:
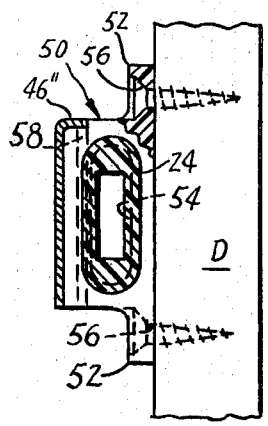
Figure 10:
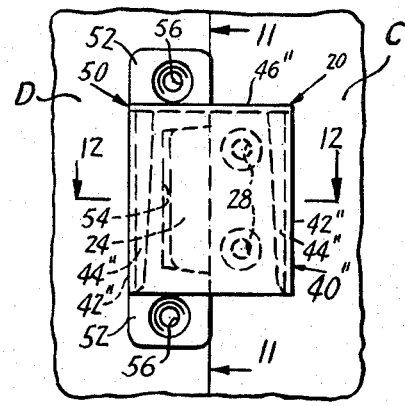
Figure 12:
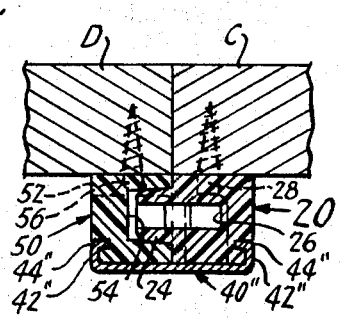

A further modification of the invention is illustrated in FIG. 10, whereby separate members C and D are joined by utilizing the invention with the addition of mounting ears or flanges 52 to one of the block members, illustrated as the female block member 50 containing the female element 54, the ears or flanges 52 containing countersunk screw holes permitting the block members to be joined to the separate members C and D in such fashion as to permit a 180° angle joint. The male block member is unchanged, containing a side element 42'', a top 46'', with a locking cover 40'', and there is a tapered locking element 44''. FIG. 11 shows this modification, with particular emphasis on the attachment of the separate member to the block member bearing the flanges or ears 52, with screws inserted through the countersunk screw holes 56.

Figure 13:
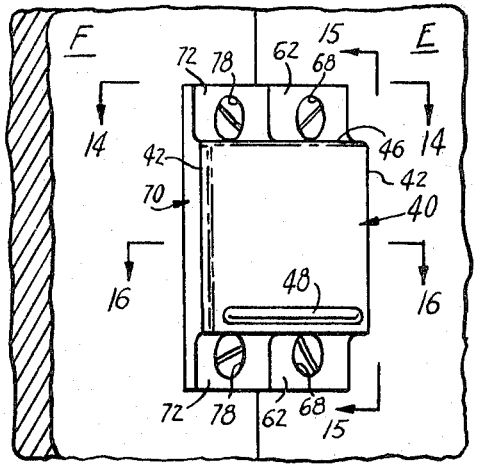
Figure 15:
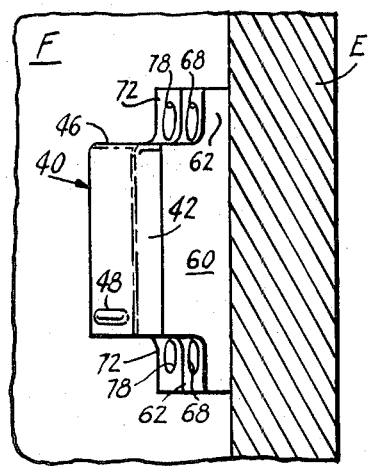
Figure 14:
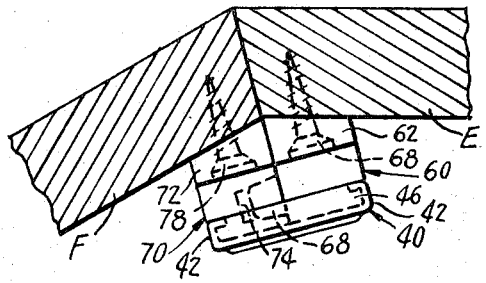
Figure 16:
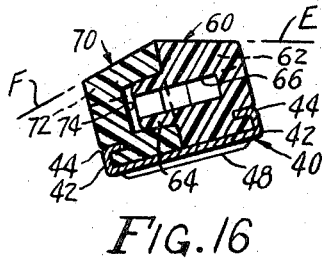

Another modification of the invention is illustrated in FIG. 13, wherein the female block member 70 and the male block member 60 contain angled mounted flanges 72 and 62 respectively with countersunk screw holes 78 and 68 respectively, whereby the separate members E and F may be joined at any angle, depending on the angle of the ears or flanges 72 and 62. This is shown more particularly in plan view FIG. 14, side view FIG. 15, and sectional view FIG. 16, all showing the female element 74, male element 64, and mold finger press 66.

What is claimed is:

1. A fastener assembly for detachably joining together two or more separate members, said fastener assembly comprising in combination:
   a. A pair of blocks, each block having means for complementally connecting the same and means including a planar surface for mounting the same respectively on said members to be joined,
   b. each of said blocks further having a single outwardly opening tapered recessed slot means extending along a respective outer edge thereof, said slot means being disposed in a common plane opposite each other when the blocks are complementally connected forming a guideway, and
   c. a rigid locking slide member having a planar surface and oppositely disposed depending tapered flange portions of a size to fit complementally into said guideway releasably locking said blocks together.

2. A fastener assembly as defined in claim 1, wherein the means for connecting the blocks include tongue and groove means.

3. A fastener assembly as defined in claim 1, wherein aperture means are provided for mounting each of the blocks on said members.

4. A fastener assembly as defined in claim 3 wherein said apertures are countersunk to receive rigid fastener members having enlarged head members.

5. A fastener assembly as defined in claim 1 wherein each of said blocks having substantially generally parallel planar surfaces and said slide member planar surface being disposed adjacent coextensive pair of said block planar surfaces when in engagement therewith.

6. A fastener assembly as defined in claim 5 wherein each of said blocks have a second planar surface abutting one another and being co-extensive and co-planar when said blocks are in assembled condition.

7. A fastener assembly as defined in claim 6 wherein said planar mounting surfaces are coplanar.

8. A fastener assembly as defined in claim 6 wherein said planar mounting surfaces are at an angle to each other.

9. The fastener assembly of claim 1 wherein the slide member has a further depending flange positioned between said tapered flange portions adapted to engage the blocks and limit the movement of said slide member.

* * * * *